United States Patent

Hufton

Patent Number: 5,560,714
Date of Patent: Oct. 1, 1996

[54] BEARING ASSEMBLY

[75] Inventor: Peter F. Hufton, Derby, England

[73] Assignee: Rolls-Royce Power Engineering, plc, Newcastle upon Tyne, England

[21] Appl. No.: 519,610

[22] Filed: Aug. 25, 1995

[30] Foreign Application Priority Data

Sep. 21, 1994 [GB] United Kingdom ............. 9418973

[51] Int. Cl.$^6$ .................................... F16C 23/04
[52] U.S. Cl. ............... 384/114; 384/272; 384/273; 384/278; 384/905
[58] Field of Search ............................ 384/114, 278, 384/905, 272, 273, 261

[56] References Cited

U.S. PATENT DOCUMENTS 3,897,983  8/1975  Hindle .

FOREIGN PATENT DOCUMENTS

| 058272 | 8/1982 | European Pat. Off. . |
| 0188664 | 7/1986 | European Pat. Off. . |
| 0299579 | 1/1989 | European Pat. Off. . |
| 1417244 | 12/1975 | United Kingdom . |

*Primary Examiner*—Lenard A. Footland
*Attorney, Agent, or Firm*—Cushman Darby & Cushman, L.L.P.

[57] ABSTRACT

A bearing assembly comprises a piston mounted within and capable of reciprocating movement with respect of a fixed bearing shell. The bearing shell is provided with openings for the supply of a bearing medium, such as compressed air, into a clearance between the piston and the bearing shell. The bearing shell is resilient so that as the diameter of the piston increases due to thermal expansion, the diameter of the bearing shell changes to automatically maintain the clearance therebetween.

5 Claims, 2 Drawing Sheets

BEARING ASSEMBLY

The present invention relates to a bearing assembly of the type where a pressurised flow of fluid is injected between a moveable component and a bearing shell.

A problem with this type of bearing is that the clearance between the moveable component, such as a shaft or piston, and the bearing shell has to be small to minimise the flow of lubricant and power consumption. This can be a limiting factor if there is differential expansion between the moveable component and the bearing shell during operation.

The present invention seeks to provide a bearing assembly whereby a close clearance can be maintained automatically between the moveable component and the bearing shell to compensate for any differential expansion.

According to the present invention a bearing assembly comprises a bearing shell disposed around a component, the component being capable of movement relative to the bearing shell, the bearing shell being provided with a plurality of openings for the supply of a bearing medium into a clearance between the component and the bearing shell, the bearing shell being resilient so that in response to changes in size of the component, the dimensions of the bearing shell change to automatically maintain a clearance therebetween.

In the preferred embodiment of the present invention the change in size of the moveable component is due to expansion or contraction of the moveable component.

The bearing shell may be rendered resilient by means external thereto such as an axially extending hinge formed integrally therewith which is fastened with spring loaded bolts.

The clearance between the moveable component and the bearing shell may be tapered axially to reduce the leakage of the bearing medium therefrom. In the preferred embodiment the clearance is tapered axially by differential loading on the spring loaded bolts.

Grooves may be provided along the length of the bearing shell to enhance the flexibility of the bearing shell.

The present invention will now be described with reference to the accompanying drawings in which.

Figure 1:
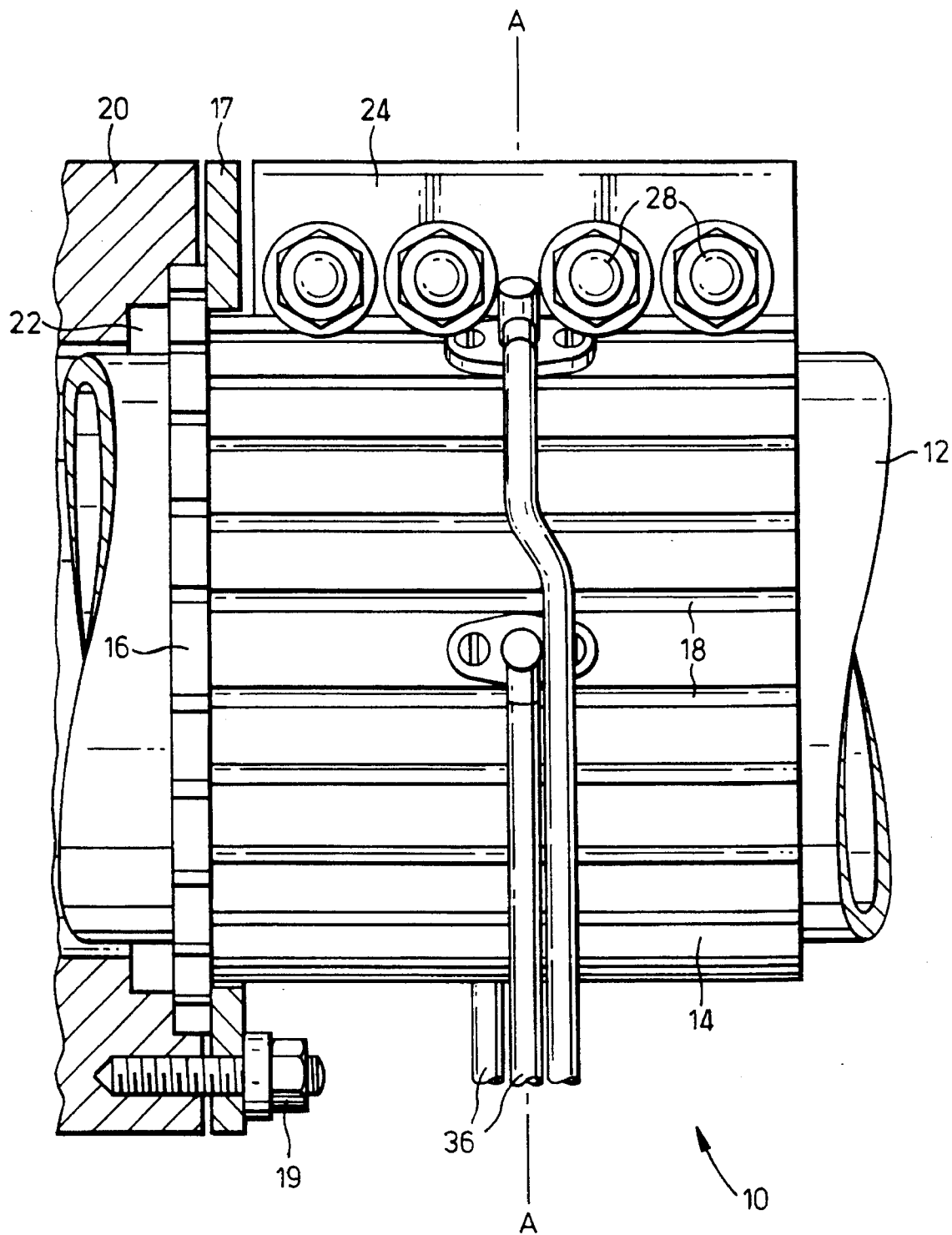
FIG. 1 is a partial cross-sectional view of a bearing assembly in accordance with the present invention.

Referring to FIG. 1 a bearing assembly 10 comprises a bearing shell 14 disposed around a piston 12. The piston 12 reciprocates in the bearing shell 14.

The bearing shell 14 is located by a flange 16 in an engine cylinder housing 20 and is secured by a clamp plate 17 and stud and nut assemblies 19. A flexible seal (not shown) is located in a recess 22 in the cylinder housing 20. The seal bears on the flange 16 and prevents leakage of engine cylinder gases along the grooves to the outside of the engine.

Figure 2:
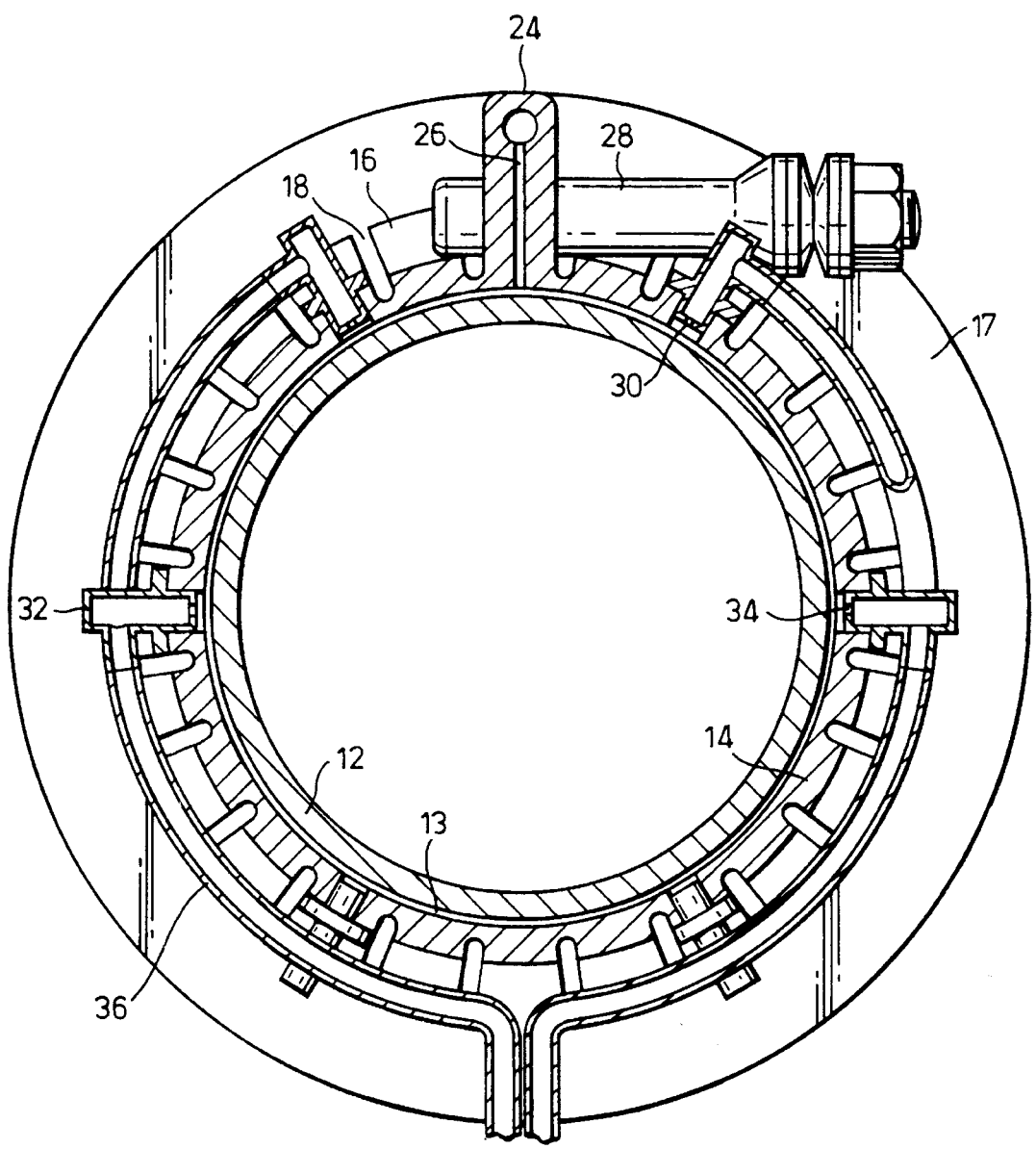
FIG. 2 is a cross-sectional view in the direction of arrow A in FIG. 1.

The bearing shell 14 and flange 16 have grooves 18 passing along their complete length. The grooves give radial flexibility whilst maintaining the axial stiffness of the bearing shell 14. The diameter of the bearing shell 14 is controlled by changing the width of a slot 26, FIG. 2, cut into a projection 24. The slot 26 stops short of the end of projection 24 to form a metallic hinge which prevents unwanted radial movement of the bearing shell 14. The width of the slot 26 is controlled by spring loaded bolt assemblies 28.

The bearing shell 14 has six holes 30 into which standpipes 32 incorporating orifices 34 are fastened. Each standpipe 32 is coupled to a supply of compressed gas (not shown) via a flexible pipe 36.

In operation with no gas supplied to the standpipes 32 the bearing shell 14 grips the piston 12 under the action of the spring loaded blot assemblies 28. When gas flows through the standpipes 32 the bearing shell 14 expands keeping its circular shape under the action of gas pressure until the gas pressure force balances the forces of the spring loaded bolt assemblies 28.

For a given gas pressure the clearance 13 between the bearing shell 14 and the piston 12 can be controlled by adjusting the spring loaded bolt assemblies 28. The clearance 13 is determined by the ratio between gas pressure and bolt spring force. If in operation the diameter of the piston 12 should increase due to thermal expansion, then because the final gas pressure is unchanged, and because the relatively small dimensional changes cause little increase in the spring load, the diameter of the flexible bearing shell 14 automatically increases to maintain a clearance 13.

The gas acts as both a lubricant and as a seal since the continuous flow of gas into the clearance 13 prevents the ingress of cylinder gases into the bearing assembly 10. To prevent leakage of the gas into the hinge 24 shims (not shown) may be used to bridge the slot 26.

By setting a varying load on each of the spring loaded bolt assemblies 28 the clearance 13 can be made to taper axially along the length of the piston 12. The tapered clearance 13 creates an asymmetric flow along the length of the piston 12 which can be used to further reduce leakage flow into or from the engine cylinder housing 20.

A bearing assembly 10 in accordance with the present invention can be use a with a component 12 capable of reciprocating or rotating motion and the principle applies to all bearing mediums, liquid or gaseous.

Although in the preferred embodiment of the present invention the bearing shell 14 is spring loaded by the bolt assemblies 28 it will be appreciated by one skilled in the art that as an alternative the bearing shell 14 may be made from a resilient material or include other means which enable it to automatically adjust to restore the clearance 13 to its original value.

I claim:

1. A bearing assembly comprising a bearing shell disposed around a component, the bearing shell and component being concentric about an axis and the component being capable of movement relative to the bearing shell, the bearing shell being provided with a plurality of openings for the supply of a pressurised bearing medium into an annular clearance between the component and the bearing shell, the bearing shell incorporating a plurality of axially extending grooves which render the bearing shell radially flexible, the bearing shell being caused to conform closely to the component by forces applied across an axial slot in the bearing shell such that in operation in response to changes in the size of the component the dimensions of the bearing shell can change to automatically maintain the annular clearance between the bearing shell and the component.

2. A bearing assembly as claimed in claim 1 in which the change in size of the component is due to thermal expansion or contraction.

3. A bearing assembly as claimed in claim 1 in which the axial slot is bound by an axially extending hinge formed integrally with the bearing shell, spring loaded bolts extend through the hinge to apply forces across the axial slot.

4. A bearing assembly as claimed in claim 1 in which the clearance between the moveable component and the bearing shell is tapered axially to reduce the leakage of the bearing medium therefrom.

5. A bearing assembly as claimed in claim 4 in which the clearance is tapered by applying differential forces across the axial slot in the bearing shell.

* * * * *